(12) United States Patent
Nakayama et al.

(10) Patent No.: US 7,641,818 B2
(45) Date of Patent: Jan. 5, 2010

(54) GA-IN-O AMORPHOUS OXIDE TRANSPARENT CONDUCTIVE FILM, AND TRANSPARENT CONDUCTIVE BASE MATERIAL COMPRISING THIS CONDUCTIVE FILM FORMED THEREON

(75) Inventors: Tokuyuki Nakayama, Ichikawa (JP); Yoshiyuki Abe, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 12/314,238

(22) Filed: Dec. 5, 2008

(65) Prior Publication Data

US 2009/0123724 A1    May 14, 2009

Related U.S. Application Data

(62) Division of application No. 11/624,309, filed on Jan. 18, 2007, now Pat. No. 7,476,343.

(30) Foreign Application Priority Data

Feb. 24, 2006 (JP) .............................. 2006-048701

(51) Int. Cl.
H01B 1/08 (2006.01)
(52) U.S. Cl. ................................ 252/518.1; 204/192.29
(58) Field of Classification Search .............. 252/518.1; 428/220, 701; 423/624; 204/192.29
See application file for complete search history.

(56) References Cited

U.S. PATENT DOCUMENTS 5,407,602 A    4/1995    Cava 6,284,393 B1    9/2001    Hosokawa et al.
7,476,343 B2    1/2009    Nakayama et al.
2007/0051926 A1    3/2007    Nakayama et al.

(Continued)

FOREIGN PATENT DOCUMENTS

JP        07-182924        7/1995

(Continued)

OTHER PUBLICATIONS

T. Minami et al., *J. Vac. Sci. Technol*, A14(3), May/Jun. 1996, pp. 1689-1693.

(Continued)

*Primary Examiner*—Mark Kopec
(74) *Attorney, Agent, or Firm*—Smith, Gambrell & Russell, LLP

(57) ABSTRACT

A sintered body target for transparent conductive film fabrication is chiefly composed of Ga, In, and O; has a Ga content ranging from 49.1 at. % to 65 at. % with respect to all metallic atoms; is chiefly constructed from a β-GaInO$_3$ phase and an In$_2$O$_3$ phase; provides an In$_2$O$_3$ phase (400)/β-GaInO$_3$ phase (111) X-ray diffraction peak intensity ratio that is 45% or less; and has a density of 5.8 g/cm$^3$ or more. A transparent conductive film obtained by using a sputtering technique is an amorphous oxide transparent conductive film chiefly composed of Ga, In, and O, so that a Ga content ranges from 49.1 at. % to 65 at. % with respect to all metallic atoms, a work function is 5.1 eV or more, and a refractive index for light with a wavelength of 633 nm ranges from 1.65 to 1.85.

10 Claims, 3 Drawing Sheets

U.S. PATENT DOCUMENTS

2007/0184286 A1* 8/2007 Nakayama et al. .......... 428/432
2008/0032106 A1* 2/2008 Nakayama et al. .......... 428/216
2008/0038529 A1 2/2008 Nakayama et al.

FOREIGN PATENT DOCUMENTS

| JP | 08-264023 | 10/1996 |
|---|---|---|
| JP | 09-259640 | 10/1997 |
| JP | 10-083719 | 3/1998 |
| JP | 10-294182 | 11/1998 |
| JP | 2002-313141 | 10/2002 |

OTHER PUBLICATIONS

T. Minami et al., *J. Vac. Sci. Technol*, A17(4), Jul./Aug. 1999, pp. 1765-1772.

* cited by examiner

FIG. 1

| | Target evaluation | | | | | Thin film evaluation | | | | |
|---|---|---|---|---|---|---|---|---|---|---|
| | Sintering temperature °C | Ga content at.% | True density g/cc | Resistivity Ω·cm | (400)/(111) intensity ratio % | Substrate temperature °C | Ga content at.% | Refractive index | Resistivity Ω·cm | Arithmetic mean height (Ra) nm | Work function eV |
| Embodiment 1 | 1250 | 50.1 | 5.83 | $8.1 \times 10^{-2}$ | 45 | 25 | 50.2 | 1.85 | $3.4 \times 10^{-2}$ | 0.52 | 5.19 |
| Embodiment 2 | 1350 | 50.1 | 6.38 | $2.9 \times 10^{-2}$ | 15 | 25 | 50.6 | 1.70 | $2.6 \times 10^{-2}$ | 0.39 | 5.34 |
| Embodiment 3 | 1400 | 50.2 | 6.38 | $3.1 \times 10^{-2}$ | 17 | 25 | 50.4 | 1.72 | $2.3 \times 10^{-2}$ | 0.37 | 5.33 |
| Embodiment 4 | 1350 | 49.4 | 6.31 | $3.6 \times 10^{-2}$ | 33 | 25 | 49.1 | 1.76 | $1.8 \times 10^{-2}$ | 0.66 | 5.21 |
| Embodiment 5 | 1350 | 54.8 | 6.31 | $1.4 \times 10^{-1}$ | 8 | 25 | 55.2 | 1.77 | $8.2 \times 10^{-2}$ | 0.82 | 5.30 |
| Embodiment 6 | 1350 | 65.0 | 6.21 | $9.0 \times 10^{-1}$ | 0 | 25 | 65.0 | 1.80 | $6.2 \times 10^{-1}$ | 1.38 | 5.12 |
| Embodiment 7 | 1350 | 50.1 | 6.38 | $2.9 \times 10^{-2}$ | 15 | 200 | 50.5 | 1.65 | $1.0 \times 10^{-2}$ | 0.45 | 5.37 |
| Embodiment 8 | 1350 | 65.0 | 6.21 | $9.0 \times 10^{-1}$ | 0 | 25 | 64.9 | 1.80 | $4.2 \times 10^{+5}$ | 1.41 | 5.13 |
| Embodiment 9 | 1350 | 65.0 | 6.21 | $9.0 \times 10^{-1}$ | 0 | 25 | 65.0 | 1.78 | $9.8 \times 10^{+7}$ | 1.36 | 5.14 |
| Comparative example 1 | 1350 | 40.2 | 6.38 | $1.0 \times 10^{-2}$ | 78 | 25 | 39.9 | 1.92 | $4.5 \times 10^{-3}$ | 1.12 | 4.82 |
| Comparative example 2 | 1350 | 48.9 | 6.31 | $2.2 \times 10^{-2}$ | 62 | 25 | 49.0 | 1.89 | $8.8 \times 10^{-3}$ | 0.61 | 4.96 |
| Comparative example 3 | 1350 | 66.1 | 6.24 | $1.0 \times 10^{+0}$ | 0 | 25 | 66.0 | 1.88 | $9.2 \times 10^{-1}$ | 2.12 | 5.02 |
| Comparative example 4 | 1100 | 50.1 | 5.22 | $9.7 \times 10^{-1}$ | * | 25 | 49.8 | 1.94 | $9.3 \times 10^{-2}$ | 1.45 | 4.92 |
| Comparative example 5 | 1200 | 50.0 | 5.56 | $4.5 \times 10^{-1}$ | 85 | 25 | 50.1 | 1.88 | $7.4 \times 10^{-2}$ | 0.40 | 4.98 |
| Comparative example 6 | 1350 | 65.0 | 6.21 | $8.4 \times 10^{-1}$ | 0 | 25 | 64.9 | 1.76 | $7.5 \times 10^{+8}$ | 1.38 | 5.13 |

* The β-GaInO₃ phase is not produced and thus the (400) / (111) intensity ratio is not obtained.

GA-IN-O AMORPHOUS OXIDE TRANSPARENT CONDUCTIVE FILM, AND TRANSPARENT CONDUCTIVE BASE MATERIAL COMPRISING THIS CONDUCTIVE FILM FORMED THEREON

CROSS REFERENCE TO RELATED APPLICATION

This application is a divisional of Ser. No. 11/624,309 filed Jan. 18, 2007, now U.S. Pat. No. 7,476,343, which is incorporated herein in its entirety.

BACKGROUND OF THE INVENTION

1. Field of the Invention

This invention relates to a sintered body target for transparent conductive film fabrication, used in a sputtering process or an ion plating process; a transparent conductive film used in a transparent electrode, an antistatic function, or a liquid crystal optical element for a display device, fabricated by using the target; and a transparent conductive base material comprising this transparent conductive film formed thereon.

2. Description of Related Art

Transparent conductive films that have low electric resistance and transparent conductive base materials in which the transparent conductive films are formed on transparent substrates are widely used in applications requiring their transparent and conductive properties, for example, in various applications to electric and electronic fields: flat panel displays such as liquid crystal displays and EL displays, transparent electrodes of touch panels, display devices, antistatic films, and liquid crystal optical elements. In general, as the transparent conductive films, tin-doped indium oxide films, that is, ITO (Indium-Tin-Oxide) crystal films are widely used. The ITO crystal films are excellent materials in which resistivity is low and the transmittance of light in the visible region is favorable. Formerly, most applications have been accommodated by controlling ITO characteristics.

However, new display devices, such as organic or inorganic EL elements and electronic papers, have recently been developed and requirements for transparent conductive films have been diversified so that common ITO crystal films can no longer meet the requirements.

For example, when the transparent conductive film is used as the transparent electrode of the organic EL element, it is desirable that the transparent conductive film is not the crystal film, but an amorphous film. In the ITO crystal film mentioned above, a projection structure due to crystal growth is present, and thus there is the problem that the local concentration of electric current is produced and uniform display becomes difficult. That is, the amorphous film whose surface is extremely flat is required.

When the transparent conductive film is used as the anode of the organic EL element, it is desirable that its work function is rather great because positive holes are easily injected. However, the work functions of many transparent conductive films including the ITO film are less than 5 eV, and thus a value of 5 eV or more is favorable because light-emitting efficiency can be increased.

It is further desirable that the refractive index of the transparent conductive film is lower. By using the transparent conductive film that is lower in refractive index than the ITO film, the taking-out efficiency of light from a light-emitting layer can be improved, and there is the merit that an optical design is facilitated.

As another example, in the touch panel, there is a tendency that visibility is taken into much account. In order to prevent the visibility from deteriorating, the transparent conductive film with low refractive index becomes necessary. Since the refractive index of the ITO film is as high as 2.0-2.2 and the visibility is poor, the transparent conductive film with a refractive index of at least about 1.8 is required.

It is also important that the transparent conductive film is not the crystal film, but the amorphous film. In general, an oxide crystal film has the problem that its grain boundary is slight in structure and strength is impaired.

As the problem is posed by Patent reference 1, the crystal film is particularly affected by sliding to produce cracks and peeling, and hence is unsuitable for the touch panel requiring a pen input operation.

As an example other than those mentioned above, in the application to the electronic paper characterized by flexibility, the transparent conductive film that is hard to crack with respect to bending is essential. In general, it is known that the oxide crystal film has the grain boundary that is slight in structure, and is liable to crack, while the amorphous film in which the grain boundary does not exist is hard to crack. From this, it is proposed to apply an amorphous transparent conductive film as the transparent conductive film that is resistant to bending. In this application, since a substrate impaired by heat, such as a PET film, is used, it is necessary to deposit the amorphous transparent conductive film in the vicinity of room temperature. It is needless to say that the low refractive index is important for the amorphous transparent conductive film as in the touch panel.

In FIGS. 10, 11, and 12 of Japanese Patent Kokai No. 2002-313141, the work functions of individual transparent conductive films are shown. According to this publication, transparent conductive films having work functions in excess of 5 eV are limited to a $(Ga, In)_2O_3$ crystal film, a $GaInO_3$ crystal film, a $ZnSnO_3$ crystal film, and a $ZnO$ crystal film. That is, at present, no amorphous film exists which can be deposited at room temperature and has a work function of more than 5 eV.

Japanese Patent Kokai No. Hei 10-294182 proposes an organic electroluminescence element comprising an organic layer that contains an organic light-emitting layer, sandwiched between an anode and a cathode, in which the cathode includes, in order from a side coming in contact with the organic layer, an electron injection electrode layer, a transparent conductive film, and a metallic thin film with a resistivity of $1 \times 10^{-5}$ Ω·cm or less, laminated one over another, and a transparent thin film layer is formed outside the cathode. In this case, an amorphous transparent conductive film using an oxide composed of indium (In), zinc (Zn), and oxygen (O) is applied.

Japanese Patent Kokai No. Hei 10-83719 sets forth a transparent conductive film in which a compound metallic oxide film containing In, Sn, and Zn, as the transparent conductive film having the properties of the high transmittance of visible light and low resistance, forms at least one kind of $In_4Sn_3O_{12}$ crystal, or microcrystals or amorphism composed of In, Sn, and Zn, and as the composition of metal contains therein, an Sn content indicated by Sn×100/(In+Sn) is 40-60 at. % and a Zn content indicated by Zn×100 (In+Zn) is 10-90 at. %.

Japanese Patent Kokai No. Hei 8-264023 proposes a transparent conductive film in which, in a quasi-two-dimensional system indicated by an oxide containing magnesium (Mg) and indium (In), $MgO-In_2O_3$, as the transparent conductive film having a band gap of 3.4 eV and a refractive index of light of 2.0 that are almost the same as in a conventional transparent conductive film and possessing much higher conductivity than $MgIn_2O_4$ and $In_2O_3$, namely lower resistivity and excellent optical properties, an In content indicated by In/(Mg+In) is 70-95 at. %.

However, in any of many amorphous transparent conductive films that have been proposed so far, represented by the above prior art, the work function is less than 5 eV and the refractive index is more than 2.0, and thus it is unreasonable that such films are suitable for the applications described above.

Japanese Patent Kokai No. Hei 7-182924 proposes a gallium-indium oxide ($GaInO_3$) in which a heterovalent dopant like a quadrivalent atom is doped by a small amount. It is described that since the crystal film of this oxide is excellent in transparency and exhibits the refractive index of light as low as about 1.6, index matching with a glass substrate is improved and the electrical conductivity at nearly the same level as in a wide-band-gap semiconductor used at present can be attained. However, as discussed by T. Minami et al.: J. Vac. Sci. Technol. A17 (4), July/August 1999, pp. 1765-1772, this oxide has the work function in excess of 5 eV, but is the crystal film, not the amorphous film required for the recent display device. Additionally, in order to obtain the crystal film, it is necessary to perform the high-temperature deposition at a substrate temperature of 250-500° C. that is industrially disadvantageous. Hence, it is difficult at present to use the oxide as it is.

Further, Japanese Patent Kokai No. Hei 9-259640 proposes a transparent conductive film in which, in a quasi-two-dimensional system indicated by $Ga_2O_3$—$In_2O_3$ as the transparent conductive film having a composition range considerably different from $GaInO_3$ which has been known so far and possessing much higher conductivity than $GaInO_3$ and $In_2O_3$, namely lower resistivity and excellent optical properties, a Ga content indicated by Ga/(Ga+In) is 15-49 at. %. In particular, it is described that the transparent conductive film has the feature that the refractive index of light can be changed from about 1.8 to 2.1 by altering the composition. In the embodiments, however, the refractive index and the work function are not in any way suggested. More details are reported, by the inventors of Kokai No. Hei 9-259640, in T. Minami et al.: J. Vac. Sci. Technol. A17 (4), July/August 1999, pp. 1765-1772 and T. Minami et al.: J. Vac. Sci. Technol. A14 (3), May/June 1996, pp. 1689-1693.

As mentioned above, in T. Minami et al.: J. Vac. Sci. Technol. A17 (4), July/August 1999, pp. 1765-1772, the work function of the $(Ga, In)_2O_3$ crystal film deposited at a substrate temperature of 350° C. is merely shown, and the work function of the amorphous film is not suggested. In FIG. 6 of Kokai No. Hei 10-294182, the refractive indices of transparent conductive films composed of Ga, In, and O, particularly deposited at room temperatures are shown. According to this aspect, it is described that the refractive index of the $In_2O_3$ film is about 2.1, the transparent conductive film in which the Ga content indicated by Ga/(Ga+In) is 5-80 at. % has a refractive index of 1.9-2.3, the refractive index of the $Ga_2O_3$ film is about 1.8, and in particular, the transparent conductive film in which the Ga content indicated by Ga/(Ga+In) is 50 at. % has a refractive index of about 2.0.

As seen from the above description, the fact is that the transparent conductive film in which the deposition in the vicinity of the room temperature is possible, amorphism is provided, the work function is above 5 eV, and the refractive index is low is not yet obtained. In the applications to the organic EL element, the touch panel, and the electronic paper, therefore, no transparent conductive film has yet completely met, in good balance, demands for a transparent conductive film that is high in work function and low in refractive index, for an amorphous transparent conductive film that is hard to crack with respect to sliding and bending, and for an amorphous transparent conductive film whose surface is extremely flat, and the need for film deposition in the vicinity of the room temperature. New transparent conductive films meeting these requirements are needed. Moreover, sintered body targets for transparent conductive film fabrication for providing the transparent conductive films by using the sputtering process or the ion plating process are also needed.

SUMMARY OF THE INVENTION

A first object of the present invention is to provide a sintered body target for transparent conductive film fabrication, suitable for fabricating a transparent conductive film, in which amorphism is provided, a high work function is obtained, the refractive index in the visible region is low, peeling and cracking due to sliding and bending are hard to occur, the film surface is extremely flat, and film deposition in the vicinity of the room temperature is possible.

A second object of the present invention is to provide a transparent conductive film formed by using the sintered body target for transparent conductive film fabrication.

A third object of the present invention is to provide a transparent conductive base material having the transparent conductive film.

In order to achieve the above objects, the sintered body target for transparent conductive film fabrication according to the present invention is chiefly composed of Ga, In, and O; has a Ga content ranging from 49.1 at. % to 65 at. % with respect to all metallic atoms; is chiefly constructed from a $GaInO_3$ phase of a $\beta$-$Ga_2O_3$-type structure and an $In_2O_3$ phase of a bixbyite-type structure (hereinafter simply referred to as the $\beta$-$GaInO_3$ phase and the $In_2O_3$ phase, respectively, unless otherwise specified); provides an X-ray diffraction peak intensity ratio defined by the following equation that is 45% or less; and has a density of 5.8 $g/cm^3$ or more:

$In_2O_3$ phase (400)/$\beta$-$GaInO_3$ phase (111)×100 [%]

In the sintered body target for transparent conductive film fabrication according to the present invention, the resistivity is preferably $9.0 \times 10^{-1}$ $\Omega$·cm or less.

The transparent conductive film according to the present invention is fabricated by using the sintered body target so that the Ga content ranges from 49.1 at. % to 65 at. % with respect to all metallic atoms and a work function is 5.1 eV or more.

In the transparent conductive film according to the present invention, the refractive index for light with a wavelength of 633 nm preferably ranges from 1.65 to 1.85.

In the transparent conductive film according to the present invention, the resistivity is preferably $1.0 \times 10^{-2}$-$1.0 \times 10^{+8}$ $\Omega$·cm.

In the transparent conductive film according to the present invention, an arithmetic mean height (Ra) is 2.0 nm or less, preferably 1.0 nm or less.

The transparent conductive base material according to the present invention comprises any transparent conductive film of the above description, formed on one or both surfaces of a transparent substrate of one selected from among materials, such as a glass plate, a quartz plate, a resin plate, and a resin film.

The transparent conductive base material according to the present invention preferably comprises at least one layer of a gas barrier film and any transparent conductive film of the above description, formed in turn on one or both surfaces of a transparent substrate of one selected from a resin plate and a resin film.

The transparent conductive base material according to the present invention preferably includes at least one film of one selected from among compounds, such as silicon nitride, silicon oxide-nitride, and silicon oxide, as the gas barrier film.

The sintered body target for transparent conductive film fabrication of the present invention has a work function of 5.1 eV of more; is chiefly composed of Ga, In, and O in order to obtain the transparent conductive film having preferred optical properties and conductivity; has a Ga content ranging from 49.1 at. % to 65 at. % with respect to all metallic atoms; is chiefly constructed from a GaInO$_3$ phase of a β-Ga$_2$O$_3$-type structure and an In$_2$O$_3$ phase of a bixbyite-type structure; provides an X-ray diffraction peak intensity ratio defined by the following equation that is 45% or less; and has a density of 5.8 g/cm$^3$ or more:

$$\text{In}_2\text{O}_3 \text{ phase (400)/β-GaInO}_3 \text{ phase (111)} \times 100 \text{ [\%]} \quad (A)$$

Further, the resistivity is $9.0 \times 10^{-1}$ Ω·cm or less, which is essential for the transparent conductive film of the present invention that has the above features. Thus, the sintered body target for transparent conductive film fabrication, the transparent conductive film fabricated by using the sintered body target, and the transparent conductive base material forming the transparent conductive film are useful for applications of display devices that are further widespread.

The transparent conductive film of the present invention is an amorphous oxide transparent conductive film chiefly composed of Ga, In, and O and is designed so that a Ga content ranges from 49.1 at. % to 65 at. % with respect to all metallic atoms, the work function is 5.1 or more, the refractive index for light with a wavelength of 633 nm ranges from 1.65 to 1.85, and the resistivity is $1.0 \times 10^{-2}$-$1.0 \times 10^{+8}$ Ω·cm. In other words, the transparent conductive film has a high work function and a low refractive index relative to light in the visible region that formerly has never been obtained, and combines excellent properties inherent in the amorphous film that the film is hard to crack and the arithmetic means height is low. In addition, the transparent conductive film of the present invention can be deposited in the vicinity of the room temperature, which increases industrial utility value.

These and other features and advantages of the present invention will become apparent from the following detailed description of the preferred embodiments when taken in conjunction with the accompanying drawings.

BRIEF DESCRIPTION OF THE DRAWINGS

FIG. 1 is a table showing together the Ga content of a sintered body found by an IPC optical emission spectral analysis technique, the density calculated by an Archimedes technique by using pure water, the resistivity measured by a 4-terminal conductivity technique, and the In$_2$O$_3$ phase (400)/-GaInO$_3$ phase (111) peak intensity ratio obtained by X-ray diffraction (using a CuK α ray);

DETAILED DESCRIPTION OF THE PREFERRED EMBODIMENTS

Figure 2:
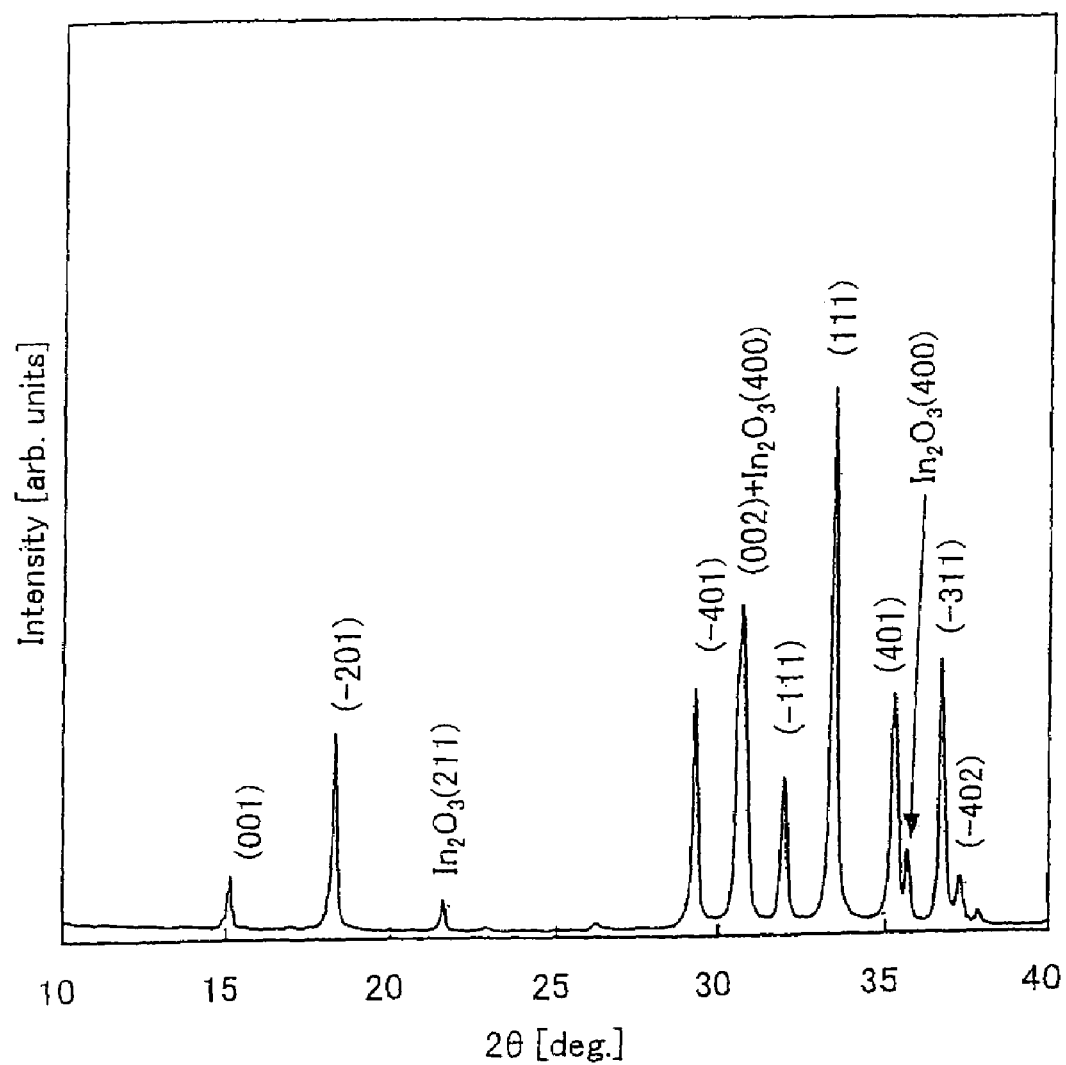
FIG. 2 is a diagram showing an X-ray diffraction pattern by the CuK α ray of the sintered body obtained at a sintering temperature of 1350° C.

In order to achieve the above-mentioned objects, the present inventors have prepared various kinds of sintered body targets for transparent conductive film fabrication to form many oxide films on transparent substrates by using the sintered body targets and have conducted researches concerning the optical properties of the oxide films and the ease of fabrication of the amorphous films. As a result, it is found that a favorable transparent conductive film is obtained by using the sintered body target for transparent conductive film fabrication that is chiefly composed of Ga, In, and O; has a Ga content ranging from 49.1 at. % to 65 at. % with respect to all metallic atoms; is chiefly constructed from a GaInO$_3$ phase of a β-Ga$_2$O$_3$-type structure and an In$_2$O$_3$ phase of a bixbyite-type structure; provides an X-ray diffraction peak intensity ratio defined by the following equation that is 45% or less; and has a density of 5.8 g/cm$^3$ or more:

$$\text{In}_2\text{O}_3 \text{ phase (400)/β-GaInO}_3 \text{ phase (111)} \times 100 \text{ [\%]} \quad (A)$$

The embodiments of the present invention will be described below. However, the present invention is not limited to the embodiments.

The sintered body target for transparent conductive film fabrication of the present invention is chiefly composed of Ga, In, and O; has a Ga content ranging from 49.1 at. % to 65 at. % with respect to all metallic atoms; is chiefly constructed from a GaInO$_3$ phase of a β-Ga$_2$O$_3$-type structure and an In$_2$O$_3$ phase of a bixbyite-type structure; provides an X-ray diffraction peak intensity ratio defined by Equation (A) that is 45% or less; has a density of 5.8 g/cm$^3$ or more; and preferably has a resistivity of $9.0 \times 10^{-1}$ Ω·cm or less.

Here, the In$_2$O$_3$ phase may be such that oxygen vacancy is introduced and may also be such that Ga is replaced with part of In. The β-GaInO$_3$ phase may be such that a Ga/In ratio of the number of atoms deviates somewhat from a stoichiometric composition and may also be such that oxygen vacancy is introduced.

Beyond the limit of the Ga composition mentioned above, the high work function and the low refractive index cannot be attained when a deposited amorphous film has the same composition as the target. However, when the target composition and the amorphous composition do not become almost the same due to the deposition condition, the above description does not apply to this case.

In the target of the present invention, it is desirable that the share of the In$_2$O$_3$ phase is rather small. Specifically, it is desirable that the peak intensity ratio (a diffraction peak area intensity ratio) of (400) reflection of the In$_2$O$_3$ phase to (111) reflection of the β-GaInO$_3$ phase in the X-ray diffraction, defined by Equation (A), is 45% or less. When the peak intensity ratio exceeds 45%, the influence exerted by the In$_2$O$_3$ phase exhibiting the refractive index of light as high as 2.0-2.2 becomes remarkable even in the case where Ga is within the composition mentioned above, and the work function as high as 5.1 eV or more and the refractive index of light as low as 1.65-1.85 cannot be attained.

According to the JCPDS card (the ASTM card), the main peaks of the β-GaInO$_3$ phase and the In$_2$O$_3$ phase in the X-ray diffraction are governed by (111) reflection and (222) reflection, respectively, but In$_2$O$_3$ phase (222) reflection is superimposed with β-GaInO$_3$ phase (002) reflection, and thus the In$_2$O$_3$ phase is evaluated by (400) reflection that has the second highest intensity.

In R. D. Shannon et al.: J. inorg. nucl. Chem., 1968, Vol. 30, pp. 1389-1398, it is described that when the β-GaInO$_3$ phase of Ga$_2$O$_3$:In$_2$O$_3$=1:1 is prepared, an unreacted In$_2$O$_3$ phase is liable to remain. The In$_2$O$_3$ phase exhibits the work function as low as 4.8-4.9 eV and the refractive index as high as 2.0-2.2, and thus when it is contained in the sintered body target for transparent conductive film fabrication, the work function of a film deposited by using this target is lowered and the refractive index is increased.

In the present invention, in order to suppress the production of the unreacted $In_2O_3$ phase in the sintered body target for transparent conductive film fabrication, raw material powder and mixing and sintering conditions have been discussed. Specifically, when an atmospheric sintering method is used, it is desirable that the raw material powder has a purity of better than 3N and is adjusted to an average grain diameter of less than 3 μm by grinding. It is desirable that compounding powder, an organic binder, and a dispersant are mixed until a uniform state is reached. It is desirable that a hydrostatic press capable of applying a uniform stress is used for molding. It is desirable that sintering temperatures range from 125° C. to 1400° C. and sintering time is at least 12 hours. It is more desirable that sintering is performed in the gas flow of oxygen. The above conditions are favorable for atmospheric sintering, and when a pressure sintering method, such as a hot-press technique, is used, the above description doe not apply to this case.

In the fabrication process of the sintered body target for transparent conductive film fabrication, a $(Ga, In)_2O_3$ phase different from the $GaInO_3$ phase and the $Ga_2O_3$ phase that is an unavoidable production phase are sometimes produced, depending on the average grain diameter after grinding of raw material powder and the sintering condition. The sintered body target of the present invention is chiefly composed of the β-$GaInO_3$ phase and the $In_2O_3$ phase, but the above $(Ga, In)_2O_3$ phase may be contained if the X-ray diffraction intensity ratio defined by the following equation is 70% or less:

Reflection by $(Ga, In)_2O_3$ phase (in the vicinity of $2\theta=28°$)/{$In_2O_3$ phase (400)+β–$GaInO_3$ phase (111)}×100 [%]  (B)

Here, "reflection by $(Ga, In)_2O_3$ phase (in the vicinity of $2\theta=28°$)" is described. According to the JCPDS card (the ASTM card), this is because the crystal structure and surface index of the $(Ga, In)_2O_3$ phase are not specified and only the surface interval and the X-ray diffraction relative intensity ratio are specified.

Even when the sintered body target for transparent conductive film fabrication that contains the $(Ga, In)_2O_3$ phase exceeding 70% in Equation (B) is used, the amorphous transparent conductive film to be formed exhibits the work function as high as 5.1 eV or more and the refractive index of light as low as 1.65-1.85. However, the sintered body with a $(Ga, In)_2O_3$ single phase exhibits the resistivity as high as about 5-10 Ω·cm, and thus when the $(Ga, In)_2O_3$ phase exceeding 70% in Equation (B) is contained in the sintered body target for transparent conductive film fabrication, the deposition rate is reduced and productivity is deteriorated. As such, it is desirable that the content of the $(Ga, In)_2O_3$ phase in Equation (B) is 70% or less. Also, an unavoidable impurity that is an unreactant, such as $Ga_2O_3$, may be contained if it is such that the X-ray diffraction peak is not observed.

In the sintered body target for transparent conductive film fabrication of the present invention, it is desirable that the density of the sintered body is 5.8 g/cm³ or more. When the density of the sintered body is less than 5.8 g/cm³, the frequency of generation of abnormal discharge in sputtering is increased, and as a result, a good-quality amorphous transparent conductive film with low refractive index cannot be obtained.

Further, in the sintered body target for transparent conductive film fabrication of the present invention, it is desirable that the resistivity is $9.0\times10^{-1}$ Ω·cm or less. When the resistivity exceeds this value, the deposition rate is reduced although DC-magnetron sputtering is possible, and therefore, productivity is impaired.

If the sintered body target for transparent conductive film fabrication that fails to satisfy these conditions is used to deposit a film, the amorphous transparent conductive film that exhibits the high work function in excess of 5.0 eV cannot be obtained. Moreover, as described in Kokai No. Hei 9-259640, T. Minami et al.: J. Vac. Sci. Technol. A17 (4), July/August 1999, pp. 1765-1772, and T. Minami et al.: J. Vac. Sci. Technol. A14 (3), May/June 1999, pp. 1689-1693, with the exception of the $Ga_2O_3$ film that exhibits almost no conductivity, only the amorphous film with the high refractive index in excess of 1.85 can be obtained, and in addition, productivity becomes low.

If the refractive index for light with a wavelength of 633 nm exceeds 1.85, the reflectance of light will be increased and the transmittance of light will be reduced. The fact that the refractive index for light with a wavelength of 633 nm is less than 1.65 indicates that the transmittance of light is excellent, and thus is favorable. In the present invention, however, such a low refractive index of light is not obtained.

It is desirable that the transparent conductive film is chiefly composed of Ga, In, and O, is an amorphous oxide transparent conductive film, and has a Ga content ranging from 49.1 at. % to 65 at. % with respect to all metallic atoms. When the Ga content is less than 49.1 at. %, the work function is low and the refractive index becomes high. This is equivalent to the conventional transparent conductive film. When the Ga content is more than 65 at. %, the conductivity required for the use of the transparent electrode is not completely obtained.

Each of the work function and the refractive index of light is affected by the construction phase of the sintered body target that is a thin film deposition source, even in the same composition. When the $In_2O_3$ phase (400) peak intensity ratio shown in Equation (A) is higher than 45%, the work function of the transparent conductive film becomes lower than 5.1 eV and the refractive index is in excess of 1.85. This is equivalent to the conventional transparent conductive film.

The resistivity depends on the amount of oxygen introduced into the amorphous film on deposition, but the control of the resistivity can be made in the range of $1.0\times10^{-2}$ to $1.0\times10^{+8}$ Ω·cm. When a larger amount of oxygen is introduced, the amorphous film can be used as an insulating film. Within the above range, wide applications to transparent electrodes and antistatic films are possible, but outside this range, the use of the amorphous film is limited to a special application.

In the transparent conductive film of the present invention, it is desirable that the arithmetic mean height (Ra) is 2.0 nm or less. Here, the arithmetic means height (Ra) is based on the definition of JIS B0601-2001. The transparent conductive film with the arithmetic mean height (Ra) in excess of 2.0 nm is unfavorable for the application, for example, to an organic EL element, requiring the flatness of a film surface.

As techniques of depositing the transparent conductive film of the present invention, there are a sputtering process and an ion plating process. In view of productivity, a magnetron sputtering process using a DC plasma (a DC-magnetron sputtering process) is desirable. In the ion plating process, a pellet obtained by the same manufacturing method as in the sintered body target for transparent conductive film fabrication is used as an evaporation source and thereby the transparent conductive film of the present invention can be obtained.

For the substrate, it is desirable to use a transparent substrate of one selected from among materials, such as a glass plate, a quartz plate, a resin plate, and a resin film, but a display device substrate is not limited to this case.

When the sputtering process or the ion plating process is used to fabricate the transparent conductive film of the present invention, it is important to use the target of the present invention in order to obtain the amorphous transparent conductive film of the present invention that is high in work function and low in refractive index.

The transparent conductive base material of the present invention comprises the transparent conductive film of the present invention formed on one or both surfaces of the transparent substrate.

When the display device requires a gas barrier property, it is desirable that, in order to impart a gas barrier function to the transparent conductive base material, at least one layer of a gas barrier film is formed between the transparent substrate and the transparent conductive film. It is desirable that the gas barrier film contains at least one of silicon nitride, silicon oxide-nitride, and silicon oxide. The gas barrier film may contain an organic film, not to speak of an inorganic film.

The transparent conductive film of the present invention has the features of exhibiting the work function in excess of 5.1 eV and the low refractive index ranging from 1.65 to 1.85 with respect to light of wavelength 633 nm. Thus, if the features can be utilized, other applications, except for the transparent electrode, will also be feasible. For example, applications to an antistatic film that can also be used at high electric resistance and to a mere optical thin film that can also be used as an insulating film are feasible.

EMBODIMENTS

Embodiments 1-3

$Ga_2O_3$ powder and $In_2O_3$ powder, each having a purity of 4N, are grounded by a ball mill and are adjusted so that an average grain diameter is 3 µm or less. After that, the powder is blended so that the Ga content indicated by Ga/(Ga+In) is 50 at. % and is mixed with an organic binder, a dispersant, and a plasticizer by the ball mill for 48 hours to prepare a slurry. Subsequently, the slurry thus obtained is sprayed and dried by a spray dryer into granulation powder.

Next, the granulation powder obtained is admitted to a rubber mold and a molded body with a diameter of 191 mm and a thickness of nearly 6 mm is fabricated by a hydrostatic press. Molded bodies likewise obtained are sintered under atmospheric pressure for 20 hours at 1250° C., 1350° C., and 1400° C., respectively, in a gas flow of oxygen. After each of sintered bodies is machined into a disk shape, and its surface is ground and shaped to have a diameter of about 6 inch and a thickness of about 5 mm.

Values of the Ga content of the sintered body found by an ICP optical emission spectral analysis technique (using SPS4000 by Seiko Instruments Inc.), the density of the sintered body measured by the Archimedes technique (using a high precision automatic densimeter by Toyo Seiki Seisakusho, Ltd.) using pure water, the resistivity measured by a 4-terminal conductivity technique (using LORESTA-IP, MCP-T250 by Mitsubishi Chemical Corporation), and the $In_2O_3$ phase (400)/β-$GaInO_3$ phase (111) peak intensity ratio obtained by the X-ray diffraction (using a CuK α ray by Rigaku Denki Kogyo Co., Ltd.) are summarized in a table shown in FIG. 1. FIG. 2 shows an X-ray diffraction pattern by the CuK α ray of the sintered body obtained at a sintering temperature of 1350° C.

Next, each sintered body is bonded to a cooled copper plate and is used as the sintered body target for transparent conductive film fabrication. As a sputtering device, SPF-530H by ANELVA Corporation is used. For substrates, a 7059 substrate by Corning Inc. and an Si substrate (by Komatsu Electronic Metals Co., Ltd.) for light refractive index measurement are used and arranged parallel with the surface of the target. A distance between the substrates and the target is set to 60 mm. A sputtering gas uses a mixing gas composed of Ar and $O_2$ so that the proportion of oxygen is set to 1.5% and the total gas pressure to 0.5 Pa. The making power is set to 200 W. On the above conditions, room temperature deposition is carried out by the DC-magnetron sputtering. The electric discharge is stabilized, and abnormality, such as occurrence of an arc discharge, is not recognized. The deposition time is controlled and the transparent conductive film with a thickness of 200 nm is obtained.

Figure 3:
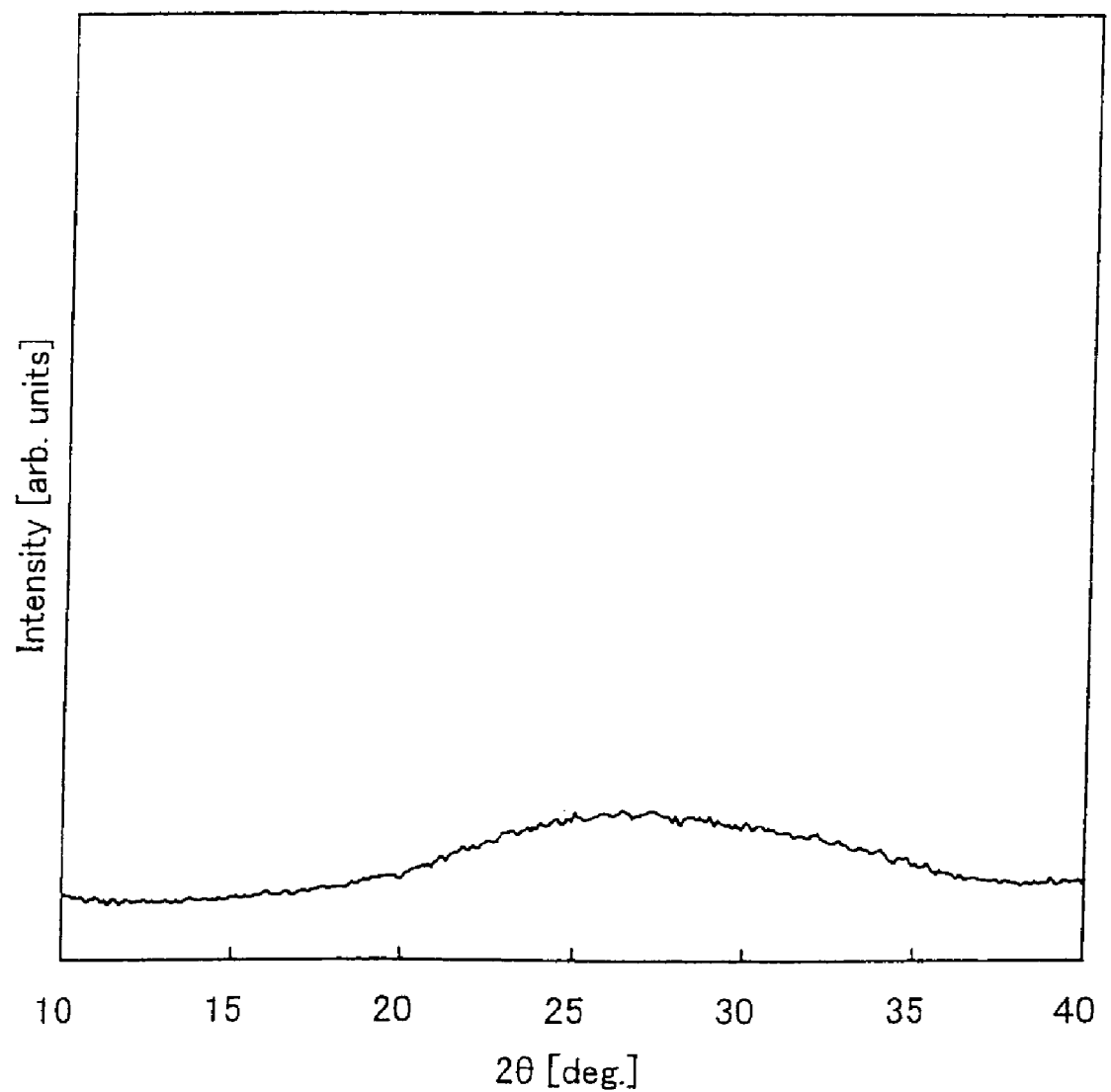
FIG. 3 is an X-ray diffraction diagram of a thin film formed by using a target sintered at 1350° C.

FIG. 3 shows an X-ray diffraction diagram of a thin film formed by using a target sintered at 1350° C. There is no definite peak, and it is confirmed that the film is amorphous. Films deposited with other targets are likewise amorphous. FIG. 1 further shows measured results of the composition obtained by the ICP optical emission spectral analysis technique, the refractive index of light (using an ellipsometer: DHA-XA by Mizojiri Optical Co., Ltd.), the resistivity, the arithmetic mean height (Ra) (using an AFM (an atomic force microscope : Nanoscope III by Digital Instruments Co., Ltd.)) and the work function (using a photoelectron spectroscope : AC-2 by RIKEN KEIKI Co., Ltd.) of the film deposited with each target.

Embodiments 4-6

The Ga contents indicated by Ga/(Ga+In) are changed to 49.5, 55, and 65 at. %, and the target is prepared on the same condition as in Embodiment 2 to perform the deposition. The abnormal discharge, as in Embodiments 1-3, is not recognized. In FIG. 1, as in Embodiments 1-3, the results of investigations of the targets and the thin films are shown. On investigation as to the structures of the obtained thin films with the X-ray diffraction, all the thin films, as in Embodiments 1-3, are amorphous.

Embodiment 7

The substrate temperature is changed to 200° C. and the same deposition as in Embodiment 2 is performed. It is confirmed by the X-ray diffraction that, in spite of an increase of the substrate temperature to 200° C., the obtained film, as in Embodiments 1-6, is amorphous. Various properties of this film are shown in FIG. 1.

Embodiments 8 and 9

The proportions of oxygen in the sputtering gas are changed to 3.0% and 5.0%, and the same deposition as Embodiment 6 is carried out. It is confirmed by the X-ray diffraction that the obtained films, as in Embodiments 1-7, are amorphous. Various properties of these films are shown in FIG. 1.

Embodiment 10

On a PET film with a thickness of 125 µm, having a hard coat on one surface, a film with a thickness of 50 nm is deposited at room temperature on the same condition as Embodiment 2, and is evaluated by a pen-sliding endurance test. A load of 5.0 N is applied to a pen (whose tip shape is 0.8 mm R) made with polyacetal and a straight sliding test is made hundred thousand times (fifty thousand times in reciprocating motion) with respect to a PET film substrate with the transparent conductive film. In this case, a sliding distance is set to 30 mm and a sliding speed to 60 mm/sec. After this sliding endurance test, observations are carried out by the naked eye and a stereomicroscope, but whitening, peeling, and cracking of the film in a sliding portion are not recognized.

Comparative Examples 1-3

The sintered body targets for transparent conductive film fabrication are prepared on the same conditions as in Embodiment 2 with the exception that the Ga contents indicated by Ga/(Ga+In) are changed to 40, 49.0, and 66 at. %. In FIG. 1, the densities, resistivities, and $In_2O_3$ phase (400)/β-$GaInO_3$ phase (111) peak intensity ratios obtained by X-ray diffraction, of the sintered body targets are shown.

Subsequently, these targets are used and depositions are performed by techniques similar to those of Embodiments 1-3. No abnormal discharge is produced on the depositions. On investigation as to the structures of the obtained thin films with the X-ray diffraction, all the thin films are amorphous. Various properties of these films are shown in FIG. 1.

Comparative Examples 4-5

The sintered body targets similar to those of Embodiments 1-3 are prepared by changing sintering temperatures to 1100 and 1200° C. In FIG. 1, the relative densities and resistivities of the sintered body targets are shown. On structural analysis with the X-ray diffraction, the β-$GaInO_3$ phase is little produced at a sintering temperature of 1100° C. and only the (Ga, In)$_2$O$_3$ phase and the In$_2$O$_3$ phase are produced. Therefore, the In$_2$O$_3$ phase (400)/β-$GaInO_3$ phase (111) peak intensity ratio cannot be found. It is obvious that the In$_2$O$_3$ phase (400) peak intensity is higher than in Embodiments 1-3 and a large number of In$_2$O$_3$ phases are produced. At a sintering temperature of 1200° C., three phases, namely the β-$GaInO_3$ phase, the (Ga, In)$_2$O$_3$ phase, and the In$_2$O$_3$ phase, are produced. In FIG. 1, only the In$_2$O$_3$ phase (400)/β-$GaInO_3$ phase (111) peak intensity ratio at 1200° C. is shown. On deposition using a target at a sintering temperature of 1100° C., the arc discharge often occurs during the deposition. Even when a target at a sintering temperature of 1200° C. is used, the arc discharge, although not so often as the case of 1100° C., considerably occurs. Specifically, when targets sintered at 1100° C. and 1200° C. and having densities below 5.8 g/cm$^3$ are used, arcing is often generated during sputter deposition. This causes the problem that stable deposition cannot be achieved in such a manner that the film is damaged and the fluctuation of the deposition rate is heavy. As a result of the structural analysis with the X-ray diffraction, all the films obtained are amorphous. Various properties of these films are shown in FIG. 1.

Comparative Example 6

The proportion of oxygen in the sputtering gas is changed to 6.0% and the same deposition as in Embodiments 8 and 9 is performed. It is confirmed by the X-ray diffraction that the film thus obtained, as in Embodiments 8 and 9, is amorphous. Various properties of this film are shown in FIG. 1.

Comparative Example 7

An ITO target (10 wt. % SnO$_2$) is used for the same substrate as Embodiment 10 and the deposition is performed at room temperature by the same specification as Embodiments 1-3 with the exception that the proportion of oxygen is changed to 2.0%. From the surface observation of the film by an AFM (an atomic force microscope: Nanoscope III by Digital Instruments Co., Ltd.), the crystal phase with a projection of about 10 nm is recognized in the amorphism. The same straight sliding test as in Embodiment 8 is made with respect to a film substrate with an ITO film. After this test, from observations carried out by the naked eye and the stereomicroscope, whitening, peeling, and cracking of the film in a sliding portion are recognized.

"Evaluation"

From the results of Embodiments 1-9 in FIG. 1, the features of the transparent conductive film of the present invention which is chiefly composed of Ga, In, and O and in which the Ga content indicated by Ga/(Ga+In) ranges from 49.1 at. % to 65 at. % are seen. Specifically, the film has properties necessary and satisfactory for the display device whose film surface is extremely flat that the work function is as high as 5.1 eV, the refractive index for light with a wavelength of 633 nm is as low as 1.65-1.85, the resistivity is $9.0 \times 10^{-1}$ Ω·cm or less, and the arithmetic mean height (Ra) is 2.0 nm or less.

Similarly, from the results of Embodiments 1-9, the features of the sintered body target for transparent conductive film fabrication of the present invention which is chiefly composed of Ga, In, and O and in which the Ga content indicated by Ga/(Ga+In) ranges from 49.1 at. % to 65 at. % are seen. Specifically, the X-ray diffraction peak intensity ratio defined by Equation (A) described below is 45% or less, the density is 5.8 g/cm$^3$ or more, and the resistivity is $9.0 \times 10^{-1}$ Ω·cm or less, so that the target has properties necessary and satisfactory to obtain the transparent conductive film.

$$In_2O_3 \text{ phase } (400)/\beta\text{-}GaInO_3 \text{ phase } (111) \times 100 \ [\%] \quad (A)$$

In particular, from each of Embodiments 2-6, it is seen that when the sintered body target for transparent conductive film fabrication with a density of 6.2 g/cm$^3$ or more is used and the deposition is performed at room temperature, the work function is at least 5.2 eV and the refractive index for light of wavelength 633 nm is in the range from 1.7 to 1.8.

From Comparative examples 1-3, it is seen that when the transparent conductive film of the present invention in which the Ga content indicated by Ga/(Ga+In) ranges from 49.1 at. % to 65 at. % is outside its composition range, original features are not exhibited. Specifically, when the Ga content is below 49.1 at. % or beyond 65 at. %, the work function becomes less than 5.1 eV and the refractive index for light of wavelength 633 nm exceeds 1.85.

As seen from Comparative examples 4 and 5, when the X-ray peak intensity ratio of the sintered body target for transparent conductive film fabrication defined by the above description exceeds 45%, the film fabricated by using the target, although within the composition range, is such that the work function becomes less than 5.1 eV and the refractive index for light of wavelength 633 nm exceeds 1.85.

As seen from Comparative example 6, when excessive oxygen is introduced to perform the deposition, the film exhibits a high resistance value exceeding the resistivity values ranging from $1.0 \times 10^{-2}$ to $1.0 \times 10^{+8}$ Ω·cm. However, in the case where the conductivity is unnecessary and the application is limited to optics alone, this film is useful.

By comparison between Embodiment 10 and Comparative example 7, it has been demonstrated that the transparent conductive film of the present invention, in contrast with the conventional ITO film, is hard to deteriorate with respect to a dynamic action from the exterior. Specifically, it has become clear that the transparent conductive film fabricated by using the sintered body target for transparent conductive film fabrication has properties necessary and satisfactory for the display device such as a touch panel or an electronic paper.

What is claimed is:

1. An amorphous oxide transparent conductive film fabricated by using a sintered body target chiefly composed of Ga, In, and O: which target also has a Ga content ranging from 49.1 at. % to 65 at. % with respect to all metallic atoms; is chiefly constructed from $GaInO_3$ phase of a $\beta$-$Ga_2O_3$-type structure and $In_2O_3$ phase of a bixbyite-type structure; provides an X-ray diffraction peak intensity ratio defined by the following equation that is 45% or less; and has a density of 5.8 g/cm$^3$ or more:

$In_2O_3$ phase (400)/$\beta$-$GaInO_3$ phase (111)×100 [%]; and wherein the conductive film has a work function of 5.1 eV or more.

2. The transparent conductive film according to claim 1, wherein the sintered body target has a resistivity of $9.0 \times 10^{+1}$ $\Omega \cdot$cm or less.

3. The transparent conductive film according to claim 1, having a refractive index for light with a wavelength of 633 nm in a range of 1.65 to 1.85.

4. The transparent conductive film according to claim 3 having an arithmetic mean height (Ra) of 2.0 nm or less.

5. The transparent conductive film according to claim 3 having an arithmetic mean height (Ra) of 1.0 nm or less.

6. The transparent conductive film according to claim 1 having a resistivity of $1.0 \times 10^{-2}$-$1.0 \times 10^{+8}$ $\Omega \cdot$cm.

7. The transparent conductive film according to claim 1 having an arithmetic mean height (Ra) of 2.0 nm or less, preferably 1.0 nm or less.

8. A transparent conductive base material comprising the transparent conductive film according to claim 1 formed on both surfaces of a transparent substrate of a material selected from among materials, such as a glass plate, a quartz plate, a resin plate, and a resin film.

9. A transparent conductive base material comprising at least one layer of a gas barrier film and the transparent conductive film according to claim 1 formed in turn on one or both sides of a transparent substrate of one selected from a resin plate and a resin film.

10. The transparent conductive base material according to claim 9, including at least one film of one selected from among compounds such as silicon nitride, silicon oxide-nitride and silicon oxide, as the gas barrier film.

* * * * *

UNITED STATES PATENT AND TRADEMARK OFFICE
CERTIFICATE OF CORRECTION

PATENT NO.       : 7,641,818 B2                                  Page 1 of 1
APPLICATION NO.  : 12/314238
DATED            : January 5, 2010
INVENTOR(S)      : Nakayama et al.

It is certified that error appears in the above-identified patent and that said Letters Patent is hereby corrected as shown below:

Title Page in item (54) on the face of the patent, please change "GA-IN-O" to --Ga-In-O--.

In column 1, line 1, please change "GA-IN-O" to --Ga-In-O--.

In Claim 2, in column 13 and on line 20, please change "$9.0 \times 10^{+1}$" to --$9.0 \times 10^{-1}$--.

Signed and Sealed this

Twenty-fourth Day of August, 2010

David J. Kappos
*Director of the United States Patent and Trademark Office*